Patented June 7, 1949

2,472,680

UNITED STATES PATENT OFFICE 2,472,680

PROCESS OF MAKING COATING COMPOSITIONS USING POLYETHYLENE COATED PIGMENTS

Burt Carlton Pratt, Brandywine Hundred, Del., assignor to E. I. du Pont de Nemours & Company, Wilmington, Del., a corporation of Delaware No Drawing. Application February 13, 1945, Serial No. 577,732

3 Claims. (Cl. 260—41)

This invention relates to compositions containing metallic pigments, and more particularly to a process for preparing such compositions having superior properties.

Dispersions of metallic pigments in film-forming vehicles are useful for the preparation of films and coatings of all types for protective and decorative purposes. However, certain types of metal pigments commonly used in these compositions are subject to corrosion under the conditions to which the films or coatings are exposed. For example, steel flake-pigmented coatings rust when exposed outdoors for appreciable lengths of time. Because of this corrosion such metal-pigmented compositions soon become of little value for their intended purpose after exposure to such corrosive conditions.

This invention has as an object the preparation of a new type of metal-pigmented dispersion. A further object is to provide metal-pigmented compositions in which the metal particles have improved resistance to corrosion. A still further object is to provide a process for preparing such dispersions. Other objects will appear hereinafter.

These objects are accomplished by the production of new pigment compositions composed of metallic pigment coated with polymerized ethylene, and by the manufacture of improved coating compositions containing metallic pigment and comprising dispersions of finely divided polymerized ethylene-coated particles in a film-forming vehicle other than polymerized ethylene. These objects are further accomplished by a method for obtaining these coating compositions which comprises depositing polymerized ethylene on the surface of finely divided metal particles and dispersing these polymerized ethylene-coated particles in a film-forming vehicle other than polymerized ethylene.

A method for carrying out this invention consists in stirring the metal particles, either in the form of flakes or granules, into a hot solution of solid ethylene polymer in an organic solvent followed by cooling the mixture, while stirring is continued, to give a dispersion of coated particles to which the desired film-forming vehicle, other than polymerized ethylene, is added. Another method consists in dispersing the metal particles in the polymerized ethylene solution as described above and then removing the solvent from the mixture, for example, by evaporation, and dispersing the dry, polymerized ethylene-coated metal particles in another vehicle.

This invention is illustrated in greater detail in the following examples in which proportions of ingredients are expressed as parts by weight unless otherwise specified.

Example I

A mixture of 5 parts of solid polymerized ethylene and 100 parts of xylene is heated at 120°–140° C. in a vessel fitted with a reflux condenser and mechanical stirrer, until the polymer is in solution. To this hot solution is added, with stirring, 95 parts of aluminum flakes and 60 parts of xylene. When well mixed, the hot suspension is poured onto a glass plate preheated to 100° C. and dried at 120° C. for 22 hours. The polymerized ethylene-coated aluminum is removed from the plate, powdered, and passed through a 60 mesh sieve. Sixteen (16) parts of this powder is stirred at room temperature in a mixture of 14 parts of a 15% solution of polystyrene in xylene, 3 parts of the unsaturated hydrocarbon plasticizer having the empirical formula $(C_3H_4)_n$ and having a viscosity at 100° C. of 21 centipoises, and 25 parts of xylene. The resulting film-forming composition has a treated pigment-binder ratio of 3/1 and contains 5% of polymerized ethylene, based on aluminum flake. This dispersion is highly false-bodied.

The composition is spread on glass plates, which have previously been coated with a thin layer of glycerol-plasticized polyvinyl alcohol, by a spreading knife set at a clearance of 20 mils. The resulting film is air-dried for 3 days and detached from the coated plate. It has a thickness of 5.5 to 6.0 mils, and is pliable and corrosion resistant. The aluminum pigment in this film is more resistant to corrosion by materials such as caustic soda or hydrogen chloride than similarly pigmented films in which the aluminum particles are not coated with polymerized ethylene.

Example II

A suspension of 95 parts of aluminum flake in a solution of 5 parts of polymerized ethylene in 200 parts of hot xylene is prepared in the same manner as described in Example I. The suspension is heated with stirring for 2 hours, after which it is allowed to cool to room temperature, stirring being continued, and 45 additional parts of xylene being added when the temperature reaches 40° C. The final suspension is smooth, stable, and highly false-bodied. A mixture of 54 parts of this suspension, 10 parts of a 25% solution of polystyrene in xylene, and 3 parts of the hydrocarbon plasticizer, mentioned in Example I is stirred at room temperature until uniform. The resulting dispersion has a treated pigment-binder ratio of 3/1 and contains 5% of polymerized ethylene, based on the aluminum flake. It is also highly false-bodied.

This dispersion is knifed onto a coated glass plate, dried, and the film removed in the same manner as described in Example I. The resulting film is 1.5–1.9 mils thick and is pliable and smooth. The aluminum pigment is resistant to corrosion.

The polymerized ethylenes used in the practice of this invention are the solid polymers of ethylene described in United States Patent 2,153,553. These polymers can be obtained by the methods disclosed in that patent or by other methods, for example, by contacting ethylene with water and a peroxy compound at a temperature of 40° C. to 350° C., and under a pressure above atmospheric which is preferably from 3 to 1500 atmospheres. The polymers of ethylene obtained by polymerizing the ethylene in admixture with minor amounts of other polymerizable organic compounds can also be used in the practice of this invention. The polymers obtained from ethylene alone that are used in the practice of this invention are those which are solids at normal temperature, and which correspond in composition substantially to $(CH_2)_x$.

The invention has been illustrated in the examples as a dispersion of aluminum flakes; however, any metallic pigment may be used. Others which may be mentioned specifically include steel, copper, bronze, magnesium, lead, zinc, nickel and the nickel-iron alloy known as Permalloy. The metallic pigment may be either in the form of flakes or granules.

Likewise, other film-forming vehicles than the polystyrene specifically mentioned in the examples can be employed. Any film-forming vehicle which is a non-solvent for the polymer of ethylene and which dries to a continuous coherent solid film, for example, polyisobutylene, ethyl cellulose, cellulose acetate, alkyd resins, drying oils and varnishes, rubber, synthetic rubber, interpolymers of vinyl chloride with vinyl acetate, polyvinyl acetate and the like can be used.

The choice of solvent for use in the preparation of the dispersion depends on the particular vehicle being used. Other useful solvents include methyl ethyl ketone, gasoline and high-flash naphtha.

The film-forming dispersion containing the polymerized ethylene-coated metallic pigment can be formed into films by any desired means. In addition to the knife coating procedure described in the examples the films can be formed by brushing or spraying the dispersion on any suitable rigid or flexible support.

The compositions of this invention are particularly useful for the formation of unsupported films or for coating the surface of flexible or rigid objects made of materials such as metals, flexible fabrics, such as cloth, paper, etc., wood, plastics and the like which are to be subjected to outdoor exposure or to atmospheres containing corrosive agents.

As many apparently widely different embodiments of this invention may be made without departing from the spirit and scope thereof, it is to be understood that I do not limit myself to the specific embodiments thereof except as defined in the appended claims.

I claim:

1. A process which comprises stirring finely divided metallic particles in a hot organic solvent solution of solid polymer consisting of polymerized ethylene, cooling the mixture to coat the metallic particles with a film of said polymer, and dispersing the coated metallic particles in a film-forming vehicle other than said polymer, said film-forming vehicle being a non-solvent for said polymer and being capable of drying to a continuous coherent solid film.

2. A process for obtaining discrete pigment particles coated with a film of solid polymer consisting of polymerized ethylene, said process comprising stirring finely divided metallic particles in hot organic solution of said polymer, cooling the mixture and removing the solvent from the coated metallic particles.

3. A process which comprises stirring finely divided metallic particles in a hot organic solvent solution of solid polymer consisting of polymerized ethylene, cooling the mixture to coat the metallic particles with a film of said polymer, removing the solvent from the mixture, and dispersing the coated metallic particles in a film-forming vehicle containing a film-forming material other than said polymer, said film-forming vehicle being a non-solvent for said polymer and being capable of drying to a continuous, coherent film.

BURT CARLTON PRATT.

REFERENCES CITED

The following references are of record in the file of this patent:

UNITED STATES PATENTS

| Number | Name | Date |
|---|---|---|
| 2,290,794 | Alvardo et al. | July 21, 1942 |
| 2,290,914 | Machlin | July 28, 1942 |
| 2,377,153 | Hunter et al. | May 29, 1945 |

OTHER REFERENCES

Ind. Eng. Chem., vol. 37, pages 532–533, June 1945. (Copy in Div. 50.)

Revue Generale des Matieres Plastiques, pages 41–42, February 1939. (Copy in Div. 50.)